United States Patent
Asif Bashir et al.

(10) Patent No.: US 12,230,298 B2
(45) Date of Patent: Feb. 18, 2025

(54) METHOD TO ENHANCE SPIN TORQUE LAYER PERFORMANCE IN A SPINTRONIC DEVICE

(71) Applicant: Western Digital Technologies, Inc., San Jose, CA (US)

(72) Inventors: Muhammad Asif Bashir, San Jose, CA (US); Alexander Goncharov, Morgan Hill, CA (US); Yaguang Wei, Pleasanton, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/226,114

(22) Filed: Jul. 25, 2023

(65) Prior Publication Data
US 2024/0135966 A1 Apr. 25, 2024
US 2024/0233759 A9 Jul. 11, 2024

Related U.S. Application Data (60) Provisional application No. 63/418,828, filed on Oct. 24, 2022.

(51) Int. Cl.
*G11B 5/31* (2006.01)
*G11B 5/127* (2006.01)
(Continued)

(52) U.S. Cl.
CPC .......... *G11B 5/3146* (2013.01); *G11B 5/1278* (2013.01); *G11B 5/235* (2013.01);
(Continued)

(58) Field of Classification Search
None
See application file for complete search history.

(56) References Cited

U.S. PATENT DOCUMENTS 8,879,205 B2 11/2014 Shiimoto et al.
10,706,877 B2 * 7/2020 Goncharov et al. . G11B 5/1278
(Continued)

FOREIGN PATENT DOCUMENTS

WO 2014085188 A1 6/2014

OTHER PUBLICATIONS

Nakagawa, Yuji et al., "Multiple spin injection into coupled field generation layers for low current operation of MAMR heads", IEEE, Feb. 4, 2022, <https://ieeexplore.ieee.org/document/9703357>.

(Continued)

*Primary Examiner* — Craig A. Renner
(74) *Attorney, Agent, or Firm* — PATTERSON + SHERIDAN, LLP (57) ABSTRACT

The present disclosure is generally related to a magnetic recording device comprising a magnetic recording head. The magnetic recording head comprises a main pole (MP), a shield, and a spintronic device disposed between the MP and the shield. The spintronic device comprises a MP notch disposed on the MP, a first spin torque layer (STL), a second STL, a spin kill layer disposed between the first and second STLs, and a shield notch. The spin kill layer prevents spin torque from being transferred between the first STL and the second STL. In a forward stack where electrons flow from the MP to the shield, the MP notch comprises FeCr and the shield notch comprises CoFe. In a reverse stack where electrons flow from the shield to the MP, the MP notch comprises CoFe and the shield notch comprises FeCr.

22 Claims, 7 Drawing Sheets

(51) Int. Cl.
*G11B 5/235* (2006.01)
*G11B 5/00* (2006.01)

(52) U.S. Cl.
CPC .............. *G11B 5/314* (2013.01); *G11B 5/315* (2013.01); *G11B 2005/0024* (2013.01)

(56) References Cited

U.S. PATENT DOCUMENTS

| | | | |
|---|---|---|---|
| 10,839,831 B1 * | 11/2020 | Nguyen et al. | G11B 5/314 |
| 10,943,611 B1 * | 3/2021 | Freitag et al. | G11B 5/1278 |
| 11,011,190 B2 | 5/2021 | Olson et al. | |
| 11,043,234 B2 | 6/2021 | Wu | |
| 11,257,514 B2 | 2/2022 | Freitag et al. | |
| 11,568,891 B1 * | 1/2023 | Chen et al. | G11B 5/1278 |
| 2011/0279921 A1 | 11/2011 | Zhang et al. | |
| 2019/0244635 A1 * | 8/2019 | Goncharov et al. | G11B 5/1278 |
| 2020/0342899 A1 * | 10/2020 | Olson et al. | G11B 5/1278 |
| 2022/0148619 A1 | 5/2022 | Freitag et al. | |
| 2024/0029759 A1 * | 1/2024 | Chen et al. | G11B 5/1278 |

OTHER PUBLICATIONS

Showa Denko K.K., "Showa Denko Develops HD Media for MAS-MAMR Technology", Bloomberg, Dec. 10, 2021, <https://www.bloomberg.com/press-releases/2021-12-10/showa-denko-develops-hd-media-for-mas-mamr-technology>.

\* cited by examiner

METHOD TO ENHANCE SPIN TORQUE LAYER PERFORMANCE IN A SPINTRONIC DEVICE

CROSS-REFERENCE TO RELATED APPLICATIONS

This application claims benefit of U.S. provisional patent application Ser. No. 63/418,828, filed Oct. 24, 2022, which is herein incorporated by reference.

BACKGROUND OF THE DISCLOSURE

Field of the Disclosure

Embodiments of the present disclosure generally relate to a magnetic recording head comprising a spintronic device, such as a write head of a data storage device, for example a magnetic media drive.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Heat-assisted magnetic recording (HAMR) and microwave-assisted magnetic recording (MAMR) are two types of energy-assisted recording technology to improve the recording density of a magnetic recording medium, such as a HDD. In MAMR, a spin torque oscillator (STO) device or a spintronic device is located next to or near the write element in order to produce a high-frequency AC field, such as in a microwave frequency band. The high-frequency AC field reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

Energy-assisted recording write heads may require an undesirable high voltage and/or an undesirable high current to produce a write field enhancement. A high voltage and/or high current may impact the lifetime and the reliability of the write head by degrading components of the write head. Lowering the voltage, moment-thickness product of the energy-assist magnetic layer, or the current can hinder writer performance, lower areal density capability (ADC), and/or limit the materials used in write heads.

Therefore, there is a need for write heads that simply and effectively facilitate write head performance reliability and high moment-thickness product of the energy-assist magnetic layer while facilitating lower voltage or current to facilitate effective and efficient magnetic recording, with the benefits of producing high ADC.

SUMMARY OF THE DISCLOSURE

The present disclosure is generally related to a magnetic recording device comprising a magnetic recording head. The magnetic recording head comprises a main pole (MP), a shield, and a spintronic device disposed between the MP and the shield. The spintronic device comprises a MP notch disposed on the MP, a first spin torque layer (STL), a second STL, a spin kill layer disposed between the first and second STLs, and a shield notch. The spin kill layer prevents spin torque from being transferred between the first STL and the second STL. In a forward stack where electrons flow from the MP to the shield, the MP notch comprises FeCr and the shield notch comprises CoFe. In a reverse stack where electrons flow from the shield to the MP, the MP notch comprises CoFe and the shield notch comprises FeCr.

In one embodiment, a magnetic recording head comprises a main pole, a shield, and a spintronic device disposed between the main pole and the shield, the spintronic device comprising: a main pole notch disposed on the main pole, a first STL disposed over the main pole, a spin kill layer disposed over the first STL, and a second STL disposed over the spin kill layer, and a shield notch disposed over the second STL.

In another embodiment, a magnetic recording head comprises a main pole, a main pole notch disposed on the main pole, a first spacer layer disposed on the main pole notch, a first STL disposed on the first spacer layer, a spin kill layer disposed over the first STL, a second STL disposed over the spin kill layer, a second spacer layer disposed on the second STL, a shield notch disposed on the second spacer layer, a hot seed layer disposed on the shield notch, and a shield disposed on the hot seed layer.

In yet another embodiment, a magnetic recording head comprises a main pole, a main pole notch disposed on the main pole, a first STL disposed over the main pole notch, a second STL disposed over the first STL, means for preventing spin torque from being transferred between the first STL and the second STL, a shield notch disposed over the second STL, a hot seed layer disposed on the shield notch, and a shield disposed on the hot seed layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Co-owned U.S. Pat. No. 10,366,714 titled "Magnetic write head for providing spin-torque-assisted write field enhancement" (by Olson et al) proposes, among other things, a write head with a spin torque layer between the main pole and trailing shield. The spin torque layer (STL) can be switched to oppose a gap field to enhance the main pole's write field. A thicker STL can increase the amount of field generated by the spin torque layer, but thickening the STL produces practical issues such as rise time and single domain ration reduction that limit scalability.

To address such scalability issues, various embodiments disclosed here propose using two STLs in the gap to oppose the gap field. In some embodiments, one STL is driven by a main pole notch and another STL is driven by a trailing shield notch. In some embodiments, one of the notches comprises a negative beta material such as FeCr. In some embodiments, the two STLs are separated by one or more spin kill layers so no torque is transferred between the two STLs. Some embodiments further include one or more layers of negative beta material placed between the two STLs to further reduce the interaction between them.

The present disclosure is generally related to a magnetic recording device comprising a magnetic recording head. The magnetic recording head comprises a main pole (MP), a shield, and a spintronic device disposed between the MP and the shield. The spintronic device comprises a MP notch disposed on the MP, a first spin torque layer (STL), a second STL, a spin kill layer disposed between the first and second STLs, and a shield notch. The spin kill layer prevents spin torque from being transferred between the first STL and the second STL. In a forward stack where electrons flow from the MP to the shield, the MP notch comprises FeCr and the shield notch comprises CoFe. In a reverse stack where electrons flow from the shield to the MP, the MP notch comprises CoFe and the shield notch comprises FeCr.

Figure 1:
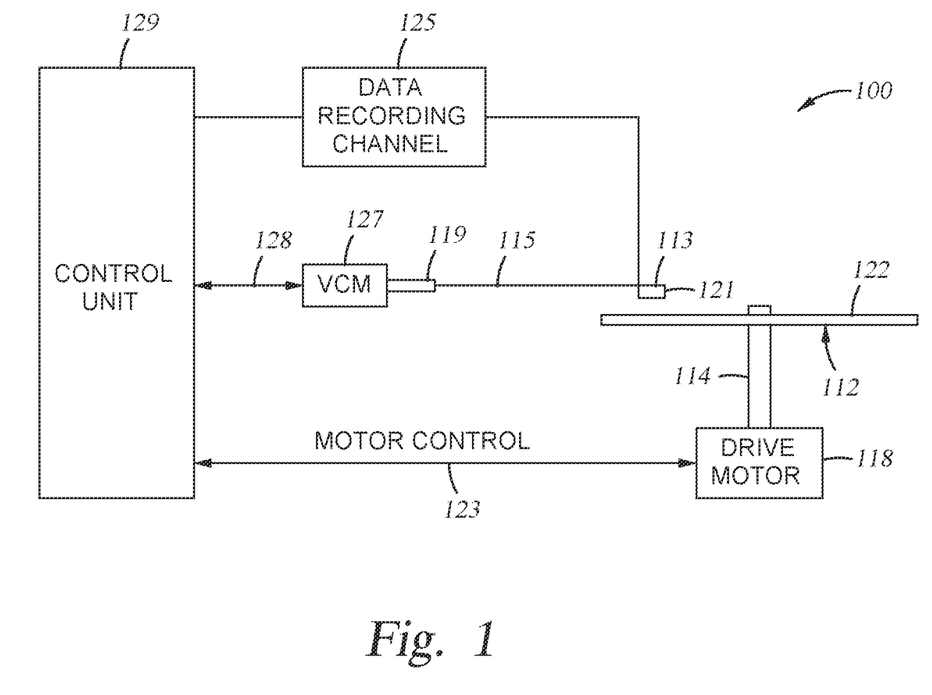
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
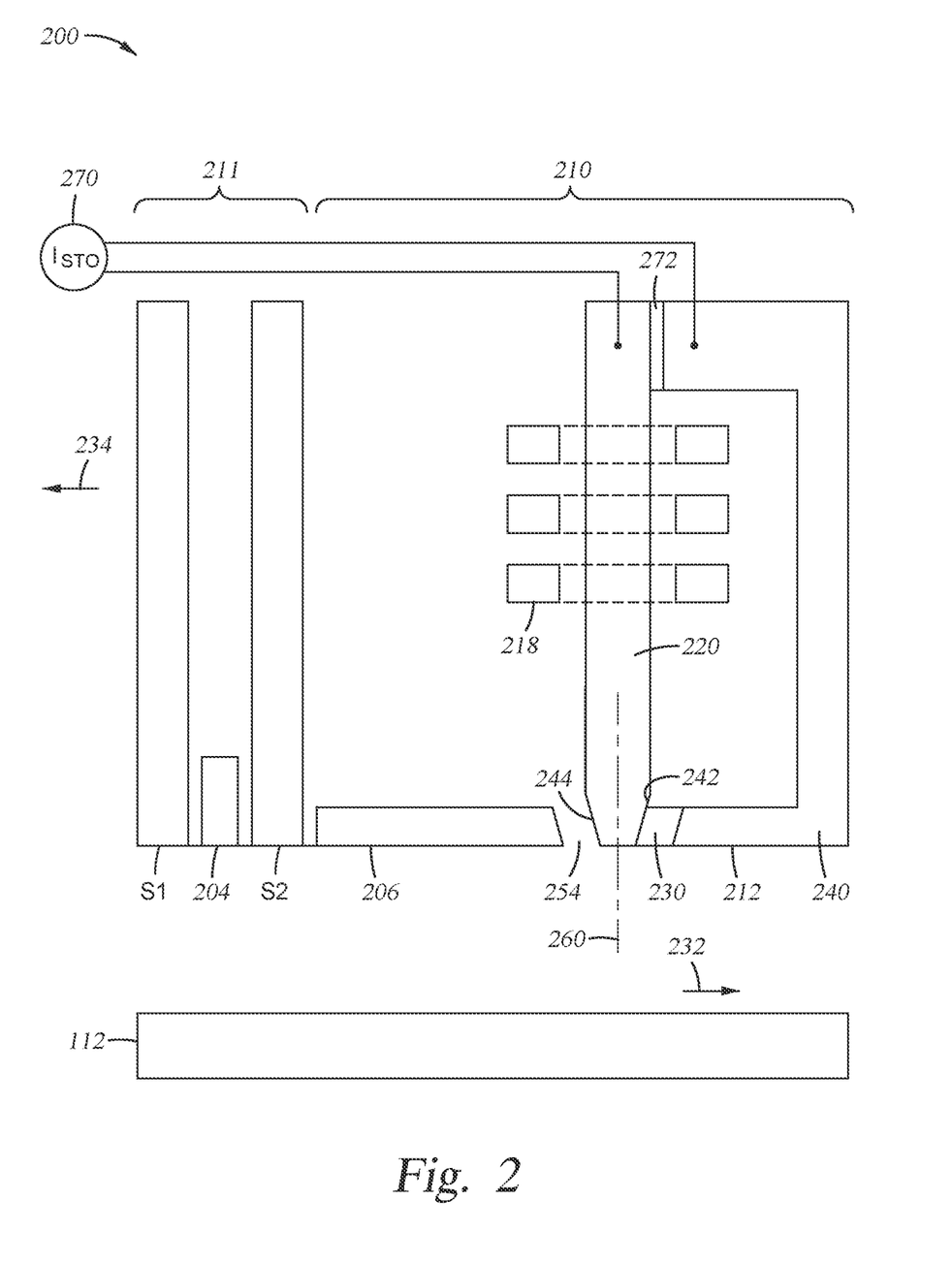
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In some embodiments, the spintronic device 230 is positioned proximate the main pole 220 and reduces the coercive force of the magnetic recording medium, so that smaller writing fields can be used to record data. In such embodiments, an electron current is applied to spintronic device 230 from a current source 270 to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 230 from a current source 270 to produce a high frequency alternating current (AC) field to the media.

In one embodiment, which can be combined with other embodiments, the spintronic device 230 is electrically coupled to the main pole 220 and the TS 240. The main pole 220 and the TS 240 are separated in an area by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In one embodiment, which can be combined with other embodiments, the spintronic device 230 is coupled to electrical leads providing an electron current other than from the main pole 220 and/or the TS 240.

FIGS. 3A-3D illustrate spintronic devices 300, 325, 350, 375, according to various embodiments. Each spintronic device 300, 325, 350, and 375 may independently be the spintronic device 230 of FIG. 2, and each spintronic device 300, 325, 350, and 375 is disposed in a gap between a main pole 302, such as the main pole 220 of FIG. 2, and a shield, such as the trailing shield 240 of FIG. 2, a leading shield 206 of FIG. 2, or a side shield (not shown). Each spintronic device 300, 325, 350, 375 may individually be a part of the disk drive 100 of FIG. 1, or a part of the read/write head 200 of FIG. 2. Each spintronic device 300, 325, 350, 375 may be referred to herein as a spin torque oscillator (STO) or STO stack.

As discussed above, an STL can be used to enhance a write field by opposing the gap field, but a single STL in the gap has scaling limitations. To address such scalability issues, various embodiments disclosed here propose using two STLs in the gap to oppose the gap field. In some embodiments, one STL is driven by a main pole notch and another STL is driven by a trailing shield notch. In some embodiments, one of the notches comprises a negative beta material such as FeCr. In some embodiments, the two STLs are separated by one or more spin kill layers so no torque is transferred between the two STLs. Some embodiments further include one or more layers of negative beta material placed between the two STLs to further reduce the interaction between them.

Figure 3A:
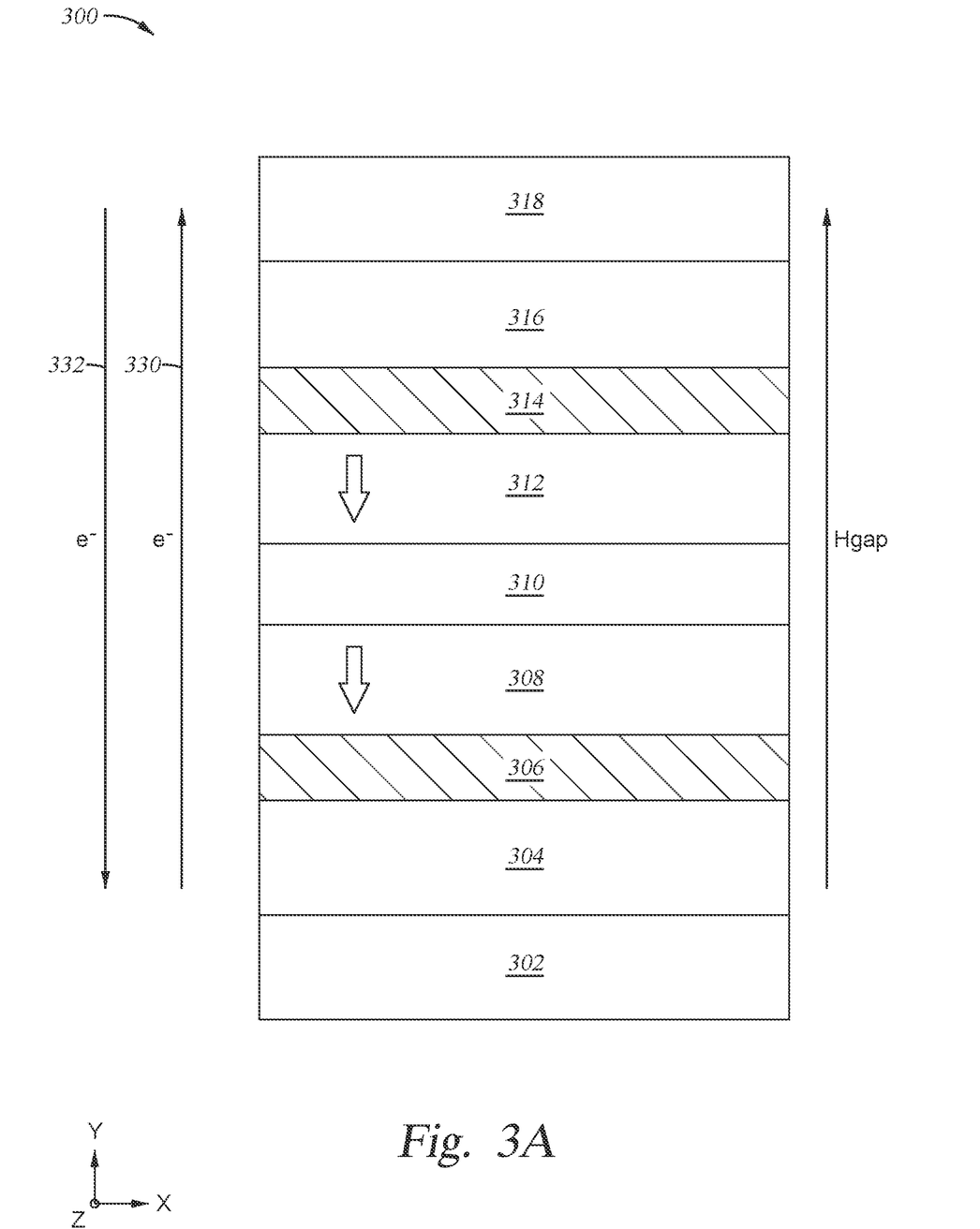
FIGS. 3A-3D illustrate spintronic devices, according to various embodiments.

The spintronic device 300 of FIG. 3A comprises a main pole (MP) notch 304 disposed on the main pole 302, a first spacer layer 306 disposed on the MP notch 304, a first spin torque layer (STL1) 308 disposed on the first spacer layer 306, a spin kill (SK) layer 310 disposed on the STL1 308, a second STL (STL2) 312 disposed on the SK layer 310, a second spacer layer 314 disposed on the STL2 312, a trailing shield (TS) notch 316 disposed on the second spacer layer 314, and a hot seed (HS) layer 318 disposed on the TS notch 316 adjacent to the trailing shield (not shown). In one embodiment, which can be combined with other embodiments, the STL1 308 and/or the STL2 312 are spin polarization layers (SPL) or spin polarizing layers. In FIGS. 3A-3D, the arrows toward the main pole (negative Y direction) in STLs 308 and 312 indicate the STLs being switched to oppose the gap field (Hgap) which is in the direction from the main pole to the trailing shield (positive Y direction).

Figure 3B:
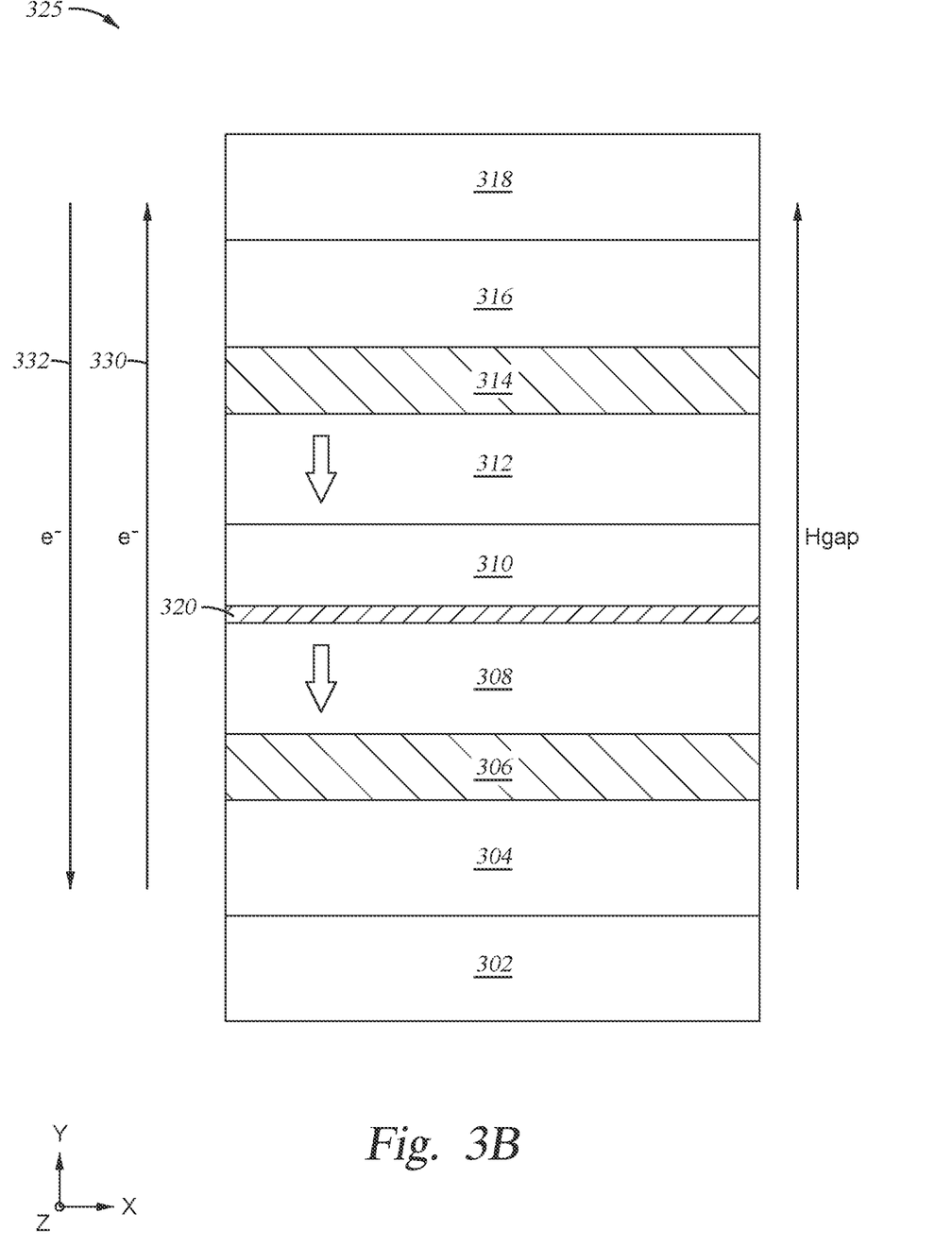

The spintronic device 325 of FIG. 3B is the same as the spintronic device 300 of FIG. 3A; however, the spintronic device 325 further comprises a first negative beta material (NBM) layer 320 disposed between the STL1 308 and the SK layer 310.

Figure 3C:
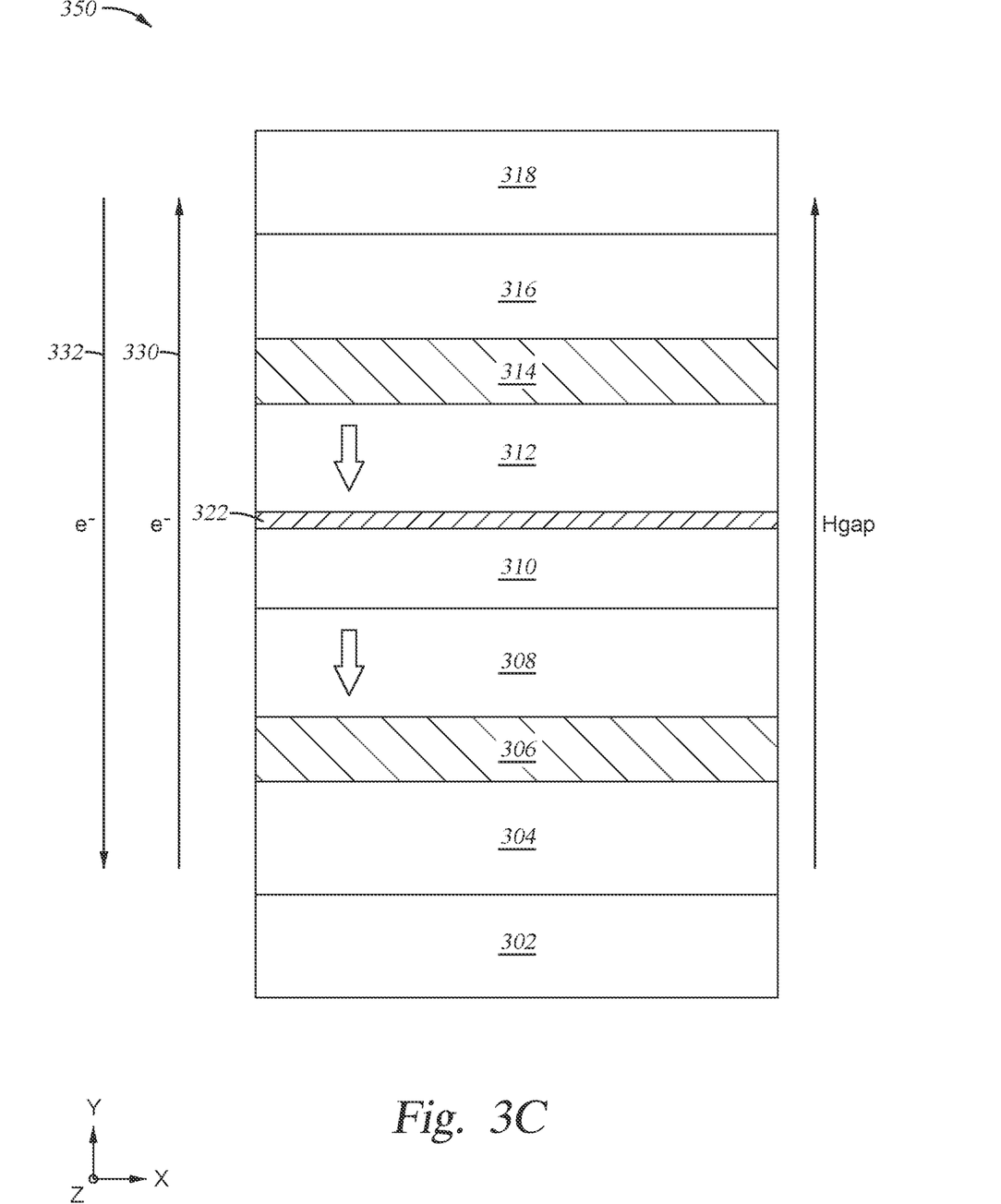

The spintronic device 350 of FIG. 3C is the same as the spintronic device 300 of FIG. 3A; however, the spintronic device 350 further comprises a second NBM layer 322 disposed between the STL2 312 and the SK layer 310.

Figure 3D:
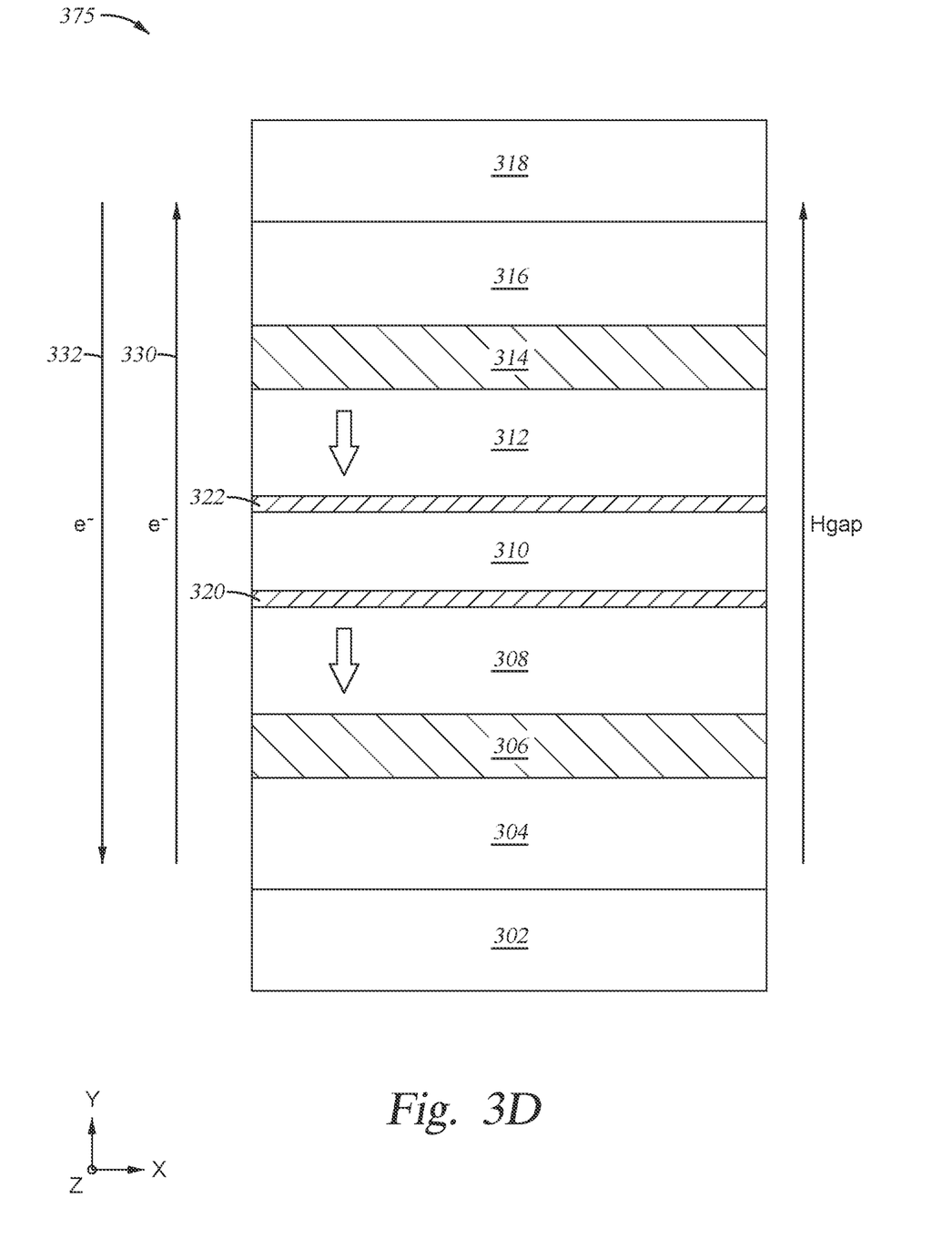

The spintronic device 375 of FIG. 3D is the same as the spintronic device 325 of FIG. 3B and/or the spintronic device 350 of FIG. 3C; however, the spintronic device 375 further comprises both the first NBM layer 320 disposed between the STL1 308 and the SK layer 310, and the second NBM layer 322 disposed between the STL2 312 and the SK layer 310 such that the SK layer 310 is sandwiched between the first NBM layer 320 and the second NBM layer 322.

As noted above, each spintronic device 300, 325, 350, 375 may be disposed between the main pole and a shield, such as the trailing shield, leading shield, or side shield. Thus, while the TS notch 316 is referred to herein as a "trailing shield" notch, the TS notch 316 may be a leading shield notch or a side shield notch. Similarly, while the HS layer 318 is referred to herein as being disposed adjacent to a trailing shield, the HS layer 318 may be disposed adjacent to a leading shield or a side shield.

In each spintronic device 300, 325, 350, and 375, the first spacer layer 306 and the second spacer layer 314 each individually comprises a long spin-diffusion length material such as Cu, Ag, or Cu and Ag alloys, or combinations thereof, and has a thickness in the y-direction of about 2 nm to about 5 nm, such as about 3 nm. The STL1 308 and the STL2 312 each individually comprises NiFe, CoFe, CoFeNi, CoMnGe, NiCo, NiFeCu, CoFeMnGe, CoMnSi, CoFeSi, and/or other soft or hard ferromagnetic materials, other Heusler alloys, other suitable magnetic layers, and/or multiple layers thereof. The STL1 308 and the STL2 312 each individually has a thickness in the y-direction of about 2 nm to about 5 nm, such as about 3 nm. The SK layer 310 may comprise a non-magnetic material having a high resistivity, such as Cr, and have a thickness in the y-direction of about 2 nm to about 5 nm, such as about 3 nm. As noted above, each spintronic device 300, 325, 350, and 375 is disposed in a gap, which may have a total width or thickness in the y-direction of about 20 nm. Thus, each spintronic device 300, 325, 350, and 375 may have a total thickness in the y-direction from the first spacer layer 306 to the second spacer layer 312 of less than about 20 nm.

In each spintronic device 300, 325, 350, 375, the MP notch 304 drives the STL1 308 while the TS notch 316 drives the STL2 312. Polarized electrons from the STL1 308 are reflected off from a first interface between the MP notch 304 and the first spacer layer 306, back toward the STL1 308. Spin accumulation and spin torque occurs at a second interface between the first spacer layer 306 and the STL1 308. Similarly, polarized electrons from the STL2 312 are reflected off from a first interface between the TS notch 316 and the second spacer layer 314, back toward the STL1 312. Spin accumulation and spin torque occurs at a second interface between the second spacer layer 314 and the STL2 312. The SK layer 310 is disposed between and in contact with the STL1 308 and the STL2 312 to prevent spin torque from being transferred in between the STL1 308 and the STL2 312.

In the spintronic devices 325, 350, and 375, the first and second NBM layers 320, 322 each individually comprises one or more of Fe, Cr, N, Co, and/or Gd, such as FeCr, or an iron nitride ($Fe_xN_x$), and has a thickness in the y-direction of about 0.5 nm to about 1 nm. The first and/or second NBM layers 320, 322 provide negative polarization at the interface (s) between the SK layer 310 and the STL1 308 and/or STL2 312. The negative polarization introduced by the first and/or second NBM layers 320, 322 enhances performance of the spintronic devices 325, 350, and 375, even if cross-talk occurs during operation. As such, the first and/or second NBM layers 320, 322 further eliminate or reduce any spin torque between the STL1 308 and the STL2 312 that may be generated when the current is applied.

When current is applied to flow electrons from the MP 302 through a spintronic device 300, 325, 350, 375 to the hot seed layer 318 in the direction shown by the arrow 330 (i.e., in the y-direction), such as by the current source 270 of FIG. 2, each spintronic device 300, 325, 350, 375 is referred to as having a forward stack configuration. In such a forward stack, the MP notch 304 comprises a negative beta material having a Bs of about 1.6 T, for example, one or more of Fe, Cr, N, Co, and/or Gd, such as FeCr, or an iron nitride (FexNx, where x is a numeral), and the TS notch 316 comprises CoFe having a Bs of about 2.4 T. The MP notch 304 and the TS notch 316 each individually has a thickness in the y-direction of about 2 nm to about 8 nm, such as about 5 nm. In some embodiments, the STL1 308 and the STL2 312 have a same thickness in the y-direction and a same magnetic moment. In other embodiments, the STL1 308 may be thinner than the STL2 312 and have a smaller magnetic moment, as the STl1 308 is driven by the MP notch 304 comprising the negative beta material in the forward stack. In one embodiment where the MP notch 304 comprises a negative beta material, the TS notch 316 may be absent, and in such an embodiment, the STL2 312 would be driven by the trailing shield.

When current is applied to flow electrons from the hot seed layer 318 through a spintronic device 300, 325, 350, 375 to the MP 302 in the direction shown by the arrow 332 (i.e., in the −y-direction), such as by the current source 270 of FIG. 2, each spintronic device 300, 325, 350, 375 is referred to as having a reverse stack configuration. In such a reverse stack, the MP notch 304 comprises CoFe having a Bs of about 2.4 T, and the TS notch 316 comprises a negative beta material having a Bs of about 1.6 T, for example, one or more of Fe, Cr, N, Co, and/or Gd, such as FeCr, or an iron nitride (FexNx, where x is a numeral). The MP notch 304 and the TS notch 316 each individually has a thickness in the y-direction of about 2 nm to about 8 nm, such as about 5 nm. In other words, the material of each of the MP notch 304 and the TS notch 316 is dependent, at least in part, on the direction of the applied current. In some embodiments, the STL1 308 and the STL2 312 have a same thickness in the y-direction and a same magnetic moment. In other embodiments, the STL2 312 may be thinner than the STL1 308 and have a smaller magnetic moment, as the STL2 312 is driven by the TS notch 316 comprising the negative beta material in the reverse stack. In one embodiment where the TS notch 316 comprises a negative beta material, the MP notch 304 may be absent, and in such an embodiment, the STL1 308 would be driven by the main pole.

Figure 4A:
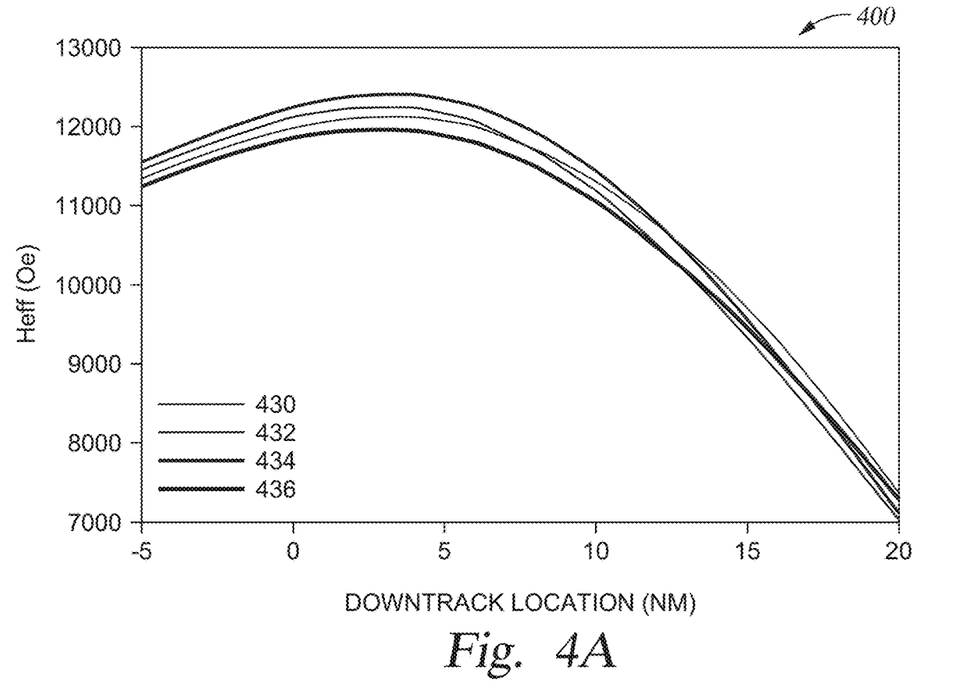
FIG. 4A shows a graph illustrating the effective magnetic field (Neff) in Oe vs a down-track location in nm for a forward stack spintronic device, according to one embodiment.
Figure 4B:
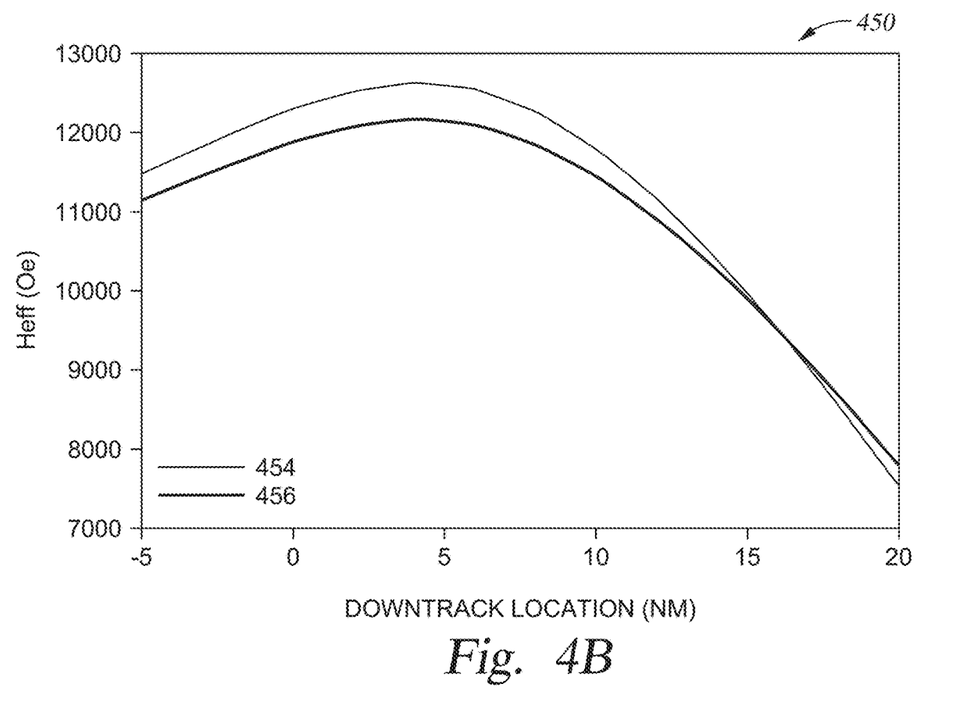
FIG. 4B shows a graph illustrating the effective magnetic field in Oe vs a down-track location in nm for a reverse stack spintronic device, according to another embodiment.

FIG. 4A shows a graph 400 illustrating the effective magnetic field (Neff) in Oe vs a down-track location in nm for a forward stack spintronic device, according to one embodiment. FIG. 4B shows a graph 450 illustrating the effective magnetic field (Neff) in Oe vs a down-track location in nm for a reverse stack spintronic device, according to another embodiment. The forward stack spintronic device modeled in the graph 400 may be any of the spintronic devices 300, 325, 350, 375 of FIGS. 3A-3D when: (1) the MP notch 304 comprises the negative beta material; and (2)

current is applied to flow electrons from the MP 302 through a spintronic device 300, 325, 350, 375 to the hot seed layer 318 in the direction shown by the arrow 330. The reverse stack spintronic device modeled in the graph 450 may be any of the spintronic devices 300, 325, 350, 375 of FIGS. 3A-3D when: (1) the TS notch 316 comprises the negative beta material; and (2) current is applied to flow electrons from the hot seed layer 318 through a spintronic device 300, 325, 350, 375 to the MP 302 in the direction shown by the arrow 332.

In the graph 400, line 430 represents the STL2 312 only being on or active (i.e., being driven by a current), line 432 represents the STL1 308 only being on or active, line 434 represents both the STL1 308 and the STL2 312 being on or active, and line 436 represents the MP notch 304 comprising the negative beta material in a spintronic device that does not comprise a STL. As shown in the graph 400 by line 434, both the STL1 308 and the STL2 312 being on or active results in a higher magnetic field and a higher gradient with no spin torque being transferred between the STL1 308 and the STL2 312.

In the graph 450, line 454 represents both the STL1 308 and the STL2 312 being on or active, and line 456 represents the TS notch 316 comprising the negative beta material. As shown in the graph 400 by line 454, both the STL1 308 and the STL2 312 being on or active results in a higher magnetic field and a higher gradient with no spin torque being transferred between the STL1 308 and the STL2 312.

Utilizing two STLs in a spintronic device produces a stronger magnetic field and gradient, facilitates simple and effective magnetic recording performance and reliability, and increases areal density capability (ADC) for magnetic recording. The SK layer and the optional thin, negative beta material layers disposed between the two STLs prevent spin torque from being transferred between the two STLs, ensuring performance of the spintronic device does not degrade while still achieving a higher magnetic field and a higher gradient.

In one embodiment, a magnetic recording head comprises a main pole, a shield, and a spintronic device disposed between the main pole and the shield, the spintronic device comprising: a main pole notch disposed on the main pole, a first spin torque layer (STL) disposed over the main pole, a spin kill layer disposed over the first STL, a second STL disposed over the spin kill layer, and a shield notch disposed over the second STL.

The spintronic device further comprises one or more negative beta material (NBM) layers disposed in contact with the spin kill layer. Each of the one or more NBM layers comprises FeCr and has a thickness of about 0.5 nm to about 1 nm. The spintronic device further comprises: a first spacer layer disposed between the main pole notch and the first STL, a second spacer layer disposed between the second STL and the shield notch, and a hot seed layer disposed between the shield notch and the shield. The spintronic device has a total thickness less than or equal to about 20 nm. A magnetic recording device comprises the magnetic recording head and a current source coupled to the magnetic recording head. The current source is configured to flow electrons from the main pole through the spintronic device to the shield, and wherein the main pole notch comprises FeCr and the shield notch comprises CoFe. The current source is configured to flow electrons from the shield through the spintronic device to the main pole, and wherein the main pole notch comprises CoFe and the shield notch comprises FeCr.

In another embodiment, a magnetic recording head comprises a main pole, a main pole notch disposed on the main pole, a first spacer layer disposed on the main pole notch, a first STL disposed on the first spacer layer, a spin kill layer disposed over the first STL, a second STL disposed over the spin kill layer, a second spacer layer disposed on the second STL, a shield notch disposed on the second spacer layer, a hot seed layer disposed on the shield notch, and a shield disposed on the hot seed layer.

The main pole notch comprises FeCr and the shield notch comprises CoFe. The second STL is thicker than the first STL, and the second STL has a higher magnetic moment than the first STL. The main pole notch comprises CoFe and the shield notch comprises FeCr. The first STL is thicker than the second STL, and the first STL has a higher magnetic moment than the second STL. The magnetic recording head further comprises one or more negative beta material (NBM) layers disposed in contact with the spin kill layer, wherein each of the one or more NBM layers comprises FeCr and has a thickness of about 0.5 nm to about 1 nm. A magnetic recording device comprises the magnetic recording head and a current source coupled to the magnetic recording head.

In yet another embodiment, a magnetic recording head comprises a main pole, a main pole notch disposed on the main pole, a first STL disposed over the main pole notch, a second STL disposed over the first STL, means for preventing spin torque from being transferred between the first STL and the second STL, a shield notch disposed over the second STL, a hot seed layer disposed on the shield notch, and a shield disposed on the hot seed layer.

The main pole notch comprises FeCr and the shield notch comprises CoFe, and wherein the second STL is thicker than the first STL. The main pole notch comprises CoFe and the shield notch comprises FeCr, and wherein the first STL is thicker than the second STL. The first STL and the second STL have a same thickness. The magnetic recording head further comprises: a first spacer layer disposed between the main pole notch and the first STL, a second spacer layer disposed between the second STL and the shield notch, and one or more negative beta material (NBM) layers disposed in contact with either the first STL or the second STL, wherein each of the one or more NBM layers comprises FeCr and has a thickness of about 0.5 nm to about 1 nm. A collective thickness of the first STL, the second STL, the first spacer layer, the second spacer layer, the one or more NBM layers, and the means for preventing spin torque from being transferred between the first STL and the second STL is less than about 20 nm. A magnetic recording device comprises the magnetic recording head and a current source coupled to the magnetic recording head.

While the foregoing is directed to embodiments of the present disclosure, other and further embodiments of the disclosure may be devised without departing from the basic scope thereof, and the scope thereof is determined by the claims that follow.

What is claimed is:
1. A magnetic recording head, comprising:
 a main pole;
 a shield; and
 a spintronic device disposed between the main pole and the shield, the spintronic device comprising:
  a main pole notch disposed on the main pole;
  a first spin torque layer (STL) disposed over the main pole notch;
  a spin kill layer disposed over the first STL;
  a second STL disposed over the spin kill layer; and
  a shield notch disposed over the second STL,
 wherein:

the main pole notch comprises FeCr and the shield notch comprises CoFe; or the main pole notch comprises CoFe and the shield notch comprises FeCr.

2. The magnetic recording head of claim 1, wherein the spintronic device further comprises one or more negative beta material (NBM) layers disposed in contact with the spin kill layer.

3. The magnetic recording head of claim 2, wherein each of the one or more NBM layers comprises FeCr and has a thickness of about 0.5 nm to about 1 nm.

4. The magnetic recording head of claim 1, wherein the spintronic device further comprises:
   a first spacer layer disposed between the main pole notch and the first STL;
   a second spacer layer disposed between the second STL and the shield notch; and
   a hot seed layer disposed between the shield notch and the shield.

5. The magnetic recording head of claim 1, wherein the spintronic device has a total thickness less than or equal to about 20 nm.

6. A magnetic recording device, comprising:
   the magnetic recording head of claim 1; and
   a current source coupled to the magnetic recording head.

7. The magnetic recording device of claim 6, wherein the current source is configured to flow electrons from the main pole through the spintronic device to the shield, and wherein the main pole notch comprises FeCr and the shield notch comprises CoFe.

8. The magnetic recording device of claim 6, wherein the current source is configured to flow electrons from the shield through the spintronic device to the main pole, and wherein the main pole notch comprises CoFe and the shield notch comprises FeCr.

9. A magnetic recording head, comprising:
   a main pole;
   a main pole notch disposed on the main pole;
   a first spacer layer disposed on the main pole notch;
   a first spin torque layer (STL) disposed on the first spacer layer;
   a spin kill layer disposed over the first STL;
   a second STL disposed over the spin kill layer;
   a second spacer layer disposed on the second STL;
   a shield notch disposed on the second spacer layer;
   a hot seed layer disposed on the shield notch; and
   a shield disposed on the hot seed layer,
   wherein:
      the main pole notch comprises FeCr and the shield notch comprises CoFe; or
      the main pole notch comprises CoFe and the shield notch comprises FeCr.

10. The magnetic recording head of claim 9, wherein the main pole notch comprises FeCr and the shield notch comprises CoFe.

11. The magnetic recording head of claim 10, wherein the second STL is thicker than the first STL, and the second STL has a higher magnetic moment than the first STL.

12. The magnetic recording head of claim 9, wherein the main pole notch comprises CoFe and the shield notch comprises FeCr.

13. The magnetic recording head of claim 12, wherein the first STL is thicker than the second STL, and the first STL has a higher magnetic moment than the second STL.

14. The magnetic recording head of claim 9, further comprising one or more negative beta material (NBM) layers disposed in contact with the spin kill layer, wherein each of the one or more NBM layers comprises FeCr and has a thickness of about 0.5 nm to about 1 nm.

15. A magnetic recording device, comprising:
   the magnetic recording head of claim 9; and
   a current source coupled to the magnetic recording head.

16. A magnetic recording head, comprising:
   a main pole;
   a main pole notch disposed on the main pole;
   a first spin torque layer (STL) disposed over the main pole notch;
   a second STL disposed over the first STL;
   means for preventing spin torque from being transferred between the first STL and the second STL;
   a shield notch disposed over the second STL;
   a hot seed layer disposed on the shield notch; and
   a shield disposed on the hot seed layer,
   wherein:
      the main pole notch comprises FeCr and the shield notch comprises CoFe; or
      the main pole notch comprises CoFe and the shield notch comprises FeCr.

17. The magnetic recording head of claim 16, wherein the main pole notch comprises FeCr and the shield notch comprises CoFe, and wherein the second STL is thicker than the first STL.

18. The magnetic recording head of claim 16, wherein the main pole notch comprises CoFe and the shield notch comprises FeCr, and wherein the first STL is thicker than the second STL.

19. The magnetic recording head of claim 16, wherein the first STL and the second STL have a same thickness.

20. The magnetic recording head of claim 16, further comprising:
   a first spacer layer disposed between the main pole notch and the first STL;
   a second spacer layer disposed between the second STL and the shield notch; and
   one or more negative beta material (NBM) layers, wherein each of the one or more NBM layers comprises FeCr and has a thickness of about 0.5 nm to about 1 nm.

21. The magnetic recording head of claim 20, wherein a collective thickness of the first STL, the second STL, the first spacer layer, the second spacer layer, the one or more NBM layers, and the means for preventing spin torque from being transferred between the first STL and the second STL is less than about 20 nm.

22. A magnetic recording device, comprising:
   the magnetic recording head of claim 16; and
   a current source coupled to the magnetic recording head.

* * * * *